United States Patent [19]
Gummeson et al.

[11] Patent Number: 5,624,599
[45] Date of Patent: Apr. 29, 1997

[54] LIQUID HARDENERS FOR SOIL GROUTING FORMULATIONS

[75] Inventors: Joel J. Gummeson, Belchertown; Alexandra Torres, West Springfield, both of Mass.

[73] Assignee: Monsanto Company, St. Louis, Mo.

[21] Appl. No.: 541,994

[22] Filed: Oct. 10, 1995

[51] Int. Cl.$^6$ .............. B01J 13/00; C09K 17/46; E02D 3/12

[52] U.S. Cl. .............. 252/182.28; 252/315.5; 252/315.6; 106/633; 405/266; 405/267

[58] Field of Search .............. 252/315.4, 315.5, 252/182.12, 182.28, 315.6; 106/633; 405/264, 266, 267

[56] References Cited

U.S. PATENT DOCUMENTS

| | | | |
|---|---|---|---|
| 3,493,406 | 2/1970 | Fillet et al. | 106/633 |
| 4,056,937 | 11/1977 | Suzuki | 405/264 |
| 4,325,658 | 4/1982 | Baker | 405/264 |
| 4,799,549 | 1/1989 | Vinot et al. | 166/293 |

*Primary Examiner*—Richard D. Lovering
*Attorney, Agent, or Firm*—Michael J. Murphy

[57] ABSTRACT

Liquid hardeners for soil grouting formulations having an acid content no more than 0.1 mg KOH per gm in the form of dimethyl ester mixtures of dimethyl succinate, dimethyl glutarate and dimethyl adipate at a concentration in the mixtures lying within a bounded area in the graph of the drawing of the specification.

4 Claims, 1 Drawing Sheet

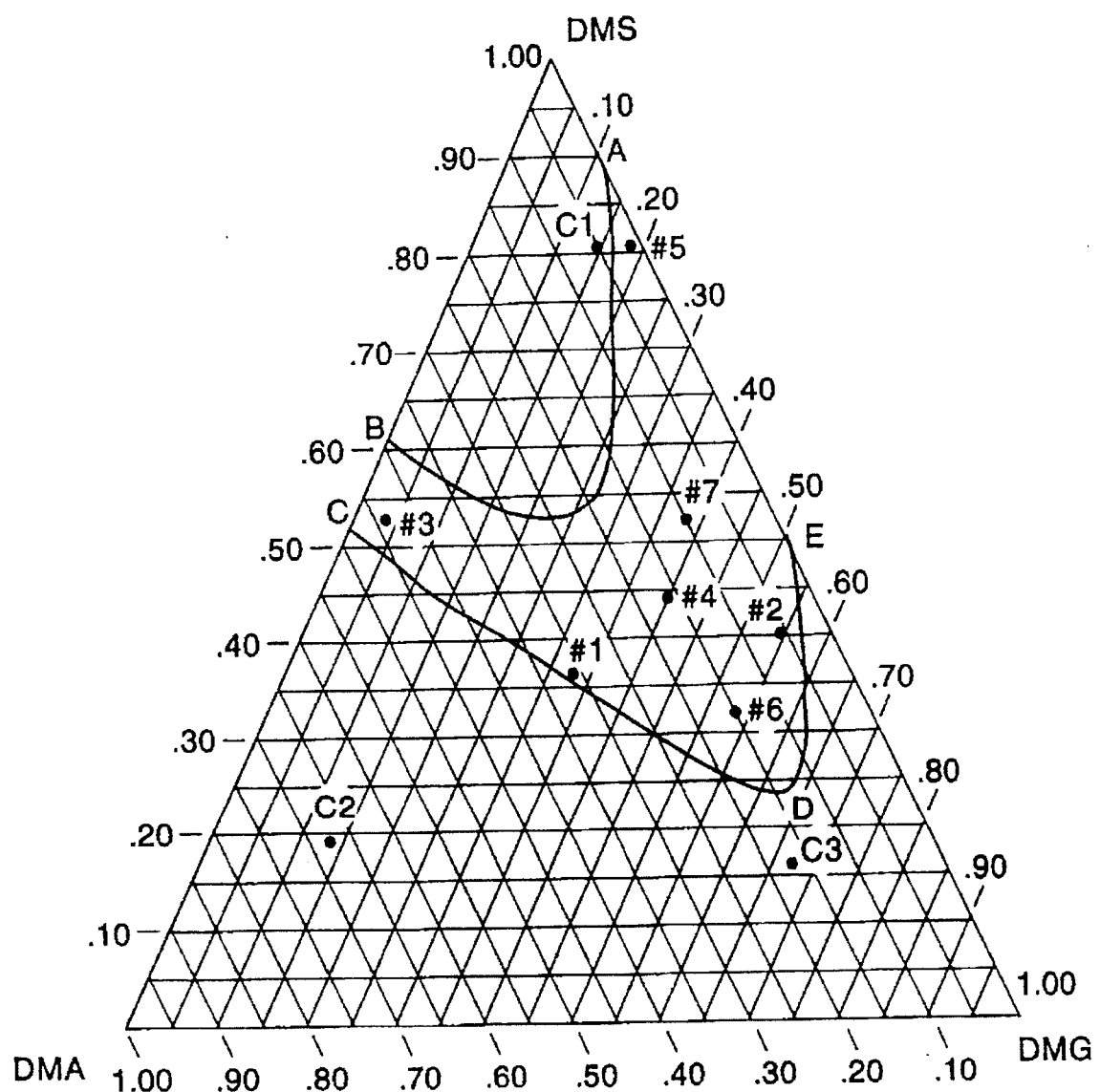

5,624,599

LIQUID HARDENERS FOR SOIL GROUTING FORMULATIONS

BACKGROUND OF THE INVENTION

This invention relates to liquid hardeners and their preparation for use in soil grouting formulations.

In constructing and repairing structures such as buildings, mines, dams, underground subway tunnels and the like, it is necessary to stabilize the soil adjacent excavation areas until the permanent structure is complete. To reinforce the soil, it is known to inject a liquid mixture of chemicals into the soil which react to form a precipitate which acts as a binder to rigidify the soil against collapse when excavated from below. The liquid mixture is dimethyl ester (DME), water and sodium silicate ("soil grouting formulation") which form the solid ester salt of sodium silicate ("silica gel"). The dimethyl ester (sometimes called dibasic ester) constituent ("liquid hardener") is derived from $C_4$–$C_6$ aliphatic dibasic acids and generally is a mixture of three $C_4$–$C_6$ aliphatic dimethyl esters. $C_4$–$C_6$ aliphatic dimethyl esters are typically a byproduct of the manufacture of adipic acid formed by esterifying the byproduct acid stream with methanol. Although the composition of the byproduct stream (and resulting dimethyl ester composition) varies, it is generally about 15 to about 30% succinic acid, about 50 to about 73% glutaric acid and about 6 to about 25% adipic acid. Dimethyl esters are commercially available from Monsanto Company, St. Louis, Mo. as Santosol™ and E. I. duPont Demours & Co., Wilmington, Del., U.S.A. or can be prepared by conventional methods known to those skilled in the art.

The silica gel binder forms in the soil after a finite time interval after injection ("gel time") which is usually about 60 minutes. To the best of present knowledge before this invention, this gel time was pretty well set and could not be varied once the reactants were combined. It would be desirable to control gel time to facilitate the soil grouting process.

SUMMARY OF THE INVENTION

Now, improvements have been made in soil grouting formulations which permit controlling gel time by means of the dimethyl ester liquid hardener composition.

Accordingly, a principal object of this invention is to reduce gel time of soil grouting formulations.

Another object is to achieve this reduction by means of the particular dimethyl ester constituent of the soil grouting formulation.

A further object is to achieve such reduction by manipulating the concentration of ester constituents in the dimethyl ester liquid hardener composition of the soil grouting formulation.

Other objects will in part be obvious and in part appear hereinafter.

These and other objects are accomplished by providing liquid hardeners for soil grouting formulations having an acid content no more than 0.1 mg KOH per gm and comprising dimethyl ester mixtures of dimethyl succinate, dimethyl glutarate and dimethyl adipate at weight % concentrations lying within the area bounded by ABCDEA in the drawing in this specification.

Also provided is a method of preparing liquid hardeners for soil grouting formulations which comprises providing a dimethyl ester mixture of dimethyl succinate, dimethyl adipate and dimethyl glutarate having an acid concentration no greater than 0.1 mg KOH per gm and adjusting the components of the mixture so their weight % concentrations lie within the area bounded by ABCDEA in the drawing in the specification.

DETAILED DESCRIPTION OF THE DRAWING

In describing the invention, reference is made to the accompanying drawing which is a contour plot showing dimethyl ester compositions in weight fraction units for soil grouting formulations according to the invention.

DETAILED DESCRIPTION OF THE INVENTION

Liquid hardener dimethyl ester compositions of this invention comprise dimethyl succinate (DMS), dimethyl glutarate (DMG) and dimethyl adipate (DMA) at weight percent concentrations equivalent to those lying within the area bounded by curved line ABCDEA of the drawing.

Soil grouting formulations are injected under pressure into and permeate as liquid through a predetermined layer of usually loose soil below ground level. During a brief finite time interval called gel time the components react in the soil to form solid silica gel. The relatively hard silica gel has a consistency of candlewax and binds the soil together sufficiently as not to collapse when soil below without silica gel is removed. If the soil grouting formulation is too thick before setup, i.e. just before silica gel precipitates, it may not permeate the outer reaches of the soil region desired to be reinforced. On the other hand, if gel time is too long, the liquid mixture may laterally permeate through more soil than intended which is wasteful of the formulation and expensive.

This invention relates concentrations of the particular dimethyl ester components of the liquid hardener dimethyl ester mixture to gel time and, more particularly, are chosen to provide a gel time of about 15 to about 35 minutes. The liquid hardener mixtures of this invention are a species of dimethyl ester compositions commercially available from Monsanto Company under the trademark Santosol.

To avoid influencing gel time, byproduct acid in the liquid hardeners of the invention is purposely kept low at a concentration no greater than 0.1 mg of potassium hydroxide (KOH) per gm. Liquid hardeners of the invention, therefore, are relatively pure and stable, the ester component concentrations being tailored to promote hydrolysis in a controlled manner when mixed with water and sodium silicate components of the soil grouting formulation.

The desired concentration of each specific dimethyl ester component in the three-component dimethyl ester liquid hardener mixture is readily obtained by conventional blending. In a commercial system associated with a distillation column providing the three-component mixture, column operating conditions may be set to provide a stream containing two of the three components and the third metered in at a predetermined appropriate rate to provide the desired concentration of each component in the three component mixture.

The invention is further described in the following illustrative examples which are not intended to limit the invention. Percentages listed are by weight.

EXAMPLE 1–7

Simulate gel time with the following laboratory test conducted at room temperature (23° C.). Add 45 g sodium silicate and 48 g $H_2O$ to a glass container and shake gently. Then add 7 gm of dimethyl ester liquid hardener and hand shake for about 10 sec. Set the container with contents aside undisturbed and, using a stop watch, note the time interval until white precipitate is first visually noticed between the interfaces. This is gel time.

Determine acid concentration of the liquid hardeners by autotitration using a standard solution of 0.1N tetrabutyl ammonium hydroxide, toluene and acetonitrile in the presence of methanol. Concentration in units of mg KOH per gm of sample is provided when the reaction between standard solution and DME is complete.

Using the gel time test, liquid hardeners with varying component concentrations are prepared and gel times noted. The acid concentration of each liquid hardener is less than 0.1 mg KOH per gm sample. Results are as follows.

|  | Example | | | | | | |
| --- | --- | --- | --- | --- | --- | --- | --- |
|  | 1 | 2 | 3 | 4 | 5 | 6 | 7 |
| % Component Conc. | | | | | | | |
| DMA | 32 | 4 | 44 | 16 | 2 | 15 | 10 |
| DMS | 36 | 40 | 53 | 44 | 80 | 31 | 52 |
| DMG | 32 | 56 | 3 | 40 | 18 | 54 | 38 |
| Gel Time (min.) | 32 | 25 | 33 | 21 | 16 | 27 | 20 |

The compositions of Exs. 1–7 identified with the example number are shown within the area bounded by ABCDEA in the graph of the drawing. All such compositions have gel times between about 15 and about 35 min.

EXAMPLES C1–C3

These control examples are not according to the invention since the gel times for the compositions which are not within the boundary line ABCDEA are too long or short.

The procedure of Exs. 1–7 is repeated with the following results. Each control composition is identified in the drawing by its control example number.

|  | Example | | |
| --- | --- | --- | --- |
| Component Conc. (wt. %) | | | |
| DMA | 2 | 68 | 17 |
| DMS | 81 | 19 | 16 |
| DMG | 17 | 13 | 67 |
| Gel Time (min.) | 12 | 70 | 55 |

The preceding description is for illustration only and not to be taken in a limited sense. Various modifications and alterations will be suggested to persons skilled in the art. The foregoing, therefore, is exemplary only and the scope of the invention is to be ascertained from the following claims.

We claim:

1. Liquid hardeners for soil grouting formulations having an acid content no more than 0.1 mg KOH per gm and comprising dimethyl ester mixtures of dimethyl succinate, dimethyl glutarate and dimethyl adipate at weight % concentrations lying within the area bounded by ABCDEA in the drawing in this specification.

2. The composition of claim 1 wherein the concentration is about 31% dimethyl succinate, about 15% dimethyl adipate and about 54% dimethyl glutarate.

3. The composition of claim 1 wherein the concentration is about 55% dimethyl succinate, 31% dimethyl adipate and about 14% dimethyl glutarate.

4. A method of preparing a liquid hardener for a soil grouting formulation which comprises:
   (a) providing a dimethyl ester mixture of dimethyl succinate, dimethyl adipate and dimethyl glutarate having an acid concentration no greater than 0.1 mg KOH per gm; and
   (b) adjusting the components of the mixture so their weight % concentrations lie within the area bounded by ABCDEA in the drawing in this specification.

* * * * *